United States Patent [19]

Sato et al.

[11] 4,267,198

[45] May 12, 1981

[54] MELT-COATED PREPARATION CONTAINING SORBIC ACID

[75] Inventors: Kazuo Sato; Akira Asahi, both of Arai; Takahiro Koyama, Amagasaki, all of Japan

[73] Assignee: Daicel Ltd., Sakai, Japan

[21] Appl. No.: 52,641

[22] Filed: Jun. 27, 1979

[30] Foreign Application Priority Data

Jun. 27, 1978 [JP] Japan ................................ 53-78243

[51] Int. Cl.³ .......................... A23B 4/10; A23B 4/12
[52] U.S. Cl. .................................... 426/332; 426/99; 426/307; 426/532; 426/609; 426/652; 427/212
[58] Field of Search ................ 426/99, 307, 332, 532, 426/609, 652; 427/212

[56] References Cited

U.S. PATENT DOCUMENTS

| | | | |
|---|---|---|---|
| 2,997,394 | 8/1961 | Melnick et al. | 426/9 |
| 3,065,080 | 11/1962 | Melnick et al. | 426/9 |
| 3,692,534 | 9/1972 | Ueno et al. | 426/99 X |
| 3,716,381 | 2/1973 | Ueno et al. | 426/332 |
| 3,754,961 | 8/1973 | Ueno et al. | 426/609 X |

*Primary Examiner*—James R. Hoffman
*Attorney, Agent, or Firm*—Sughrue, Rothwell, Mion, Zinn and Macpeak

[57] ABSTRACT

A melt-coated preparation comprising sorbic acid particles and a coating agent composed mainly of a solid fat, at least 80% by weight of the sorbic acid having a particle diameter greater than 80 microns to about 150 microns, and the amount of the sorbic acid being about 0.9 to 2 times the weight of the coating agent.

14 Claims, No Drawings

MELT-COATED PREPARATION CONTAINING SORBIC ACID

BACKGROUND OF THE INVENTION

1. Field of the Invention

This invention relates to a melt-coated preparation containing sorbic acid suitable for use as a preservative in meat and fish paste products such as sausages and boiled fish flesh pastes (known in Japan as "kamaboko"), and to a process for producing the preparation. More specifically the present invention relates to a granular sorbic acid preservative coated with a solid fat such that the sorbic acid does not come into contact with other materials but is released into the meat or fish paste product upon heating.

2. Description of the Prior Art

Mori et al. reported using a preparation of sorbic acid in the production of paste products as a preservative and to prevent elution of the acid and the decrease in pH which occurred during grinding of raw meat or fish flesh. This preparation would elute in the heating step used during production of the paste (*New Food Industry*, Aug. 1, 1966, Vol. 8, No. 8, p. 29).

As a modification of this idea, Ueno et al. invented a sorbic acid preparation for preventing the spoilage of paste products obtained by coating fine particles of sorbic acid with at least 1.5 times its weight of a coating agent composed mainly of a hardened oil having a melting point of 40° to 90° C. and which did not elute at room temperature to produce a coated particle having a diameter of 50 to 300 microns (Japanese Patent Publication No. 14104/70 corresponding to U.S. Pat. No. 3,716,381). This coated sorbic acid preparation contains sorbic acid in an amount not more than about 0.67 times the weight of the coating agent. An example in this Patent discloses a melt-coated preparation containing a hardened oil and 0.25 times its weight of sorbic acid.

In the field of bread production, fat-sorbic acid preparations are also known. U.S. Pat. No. 2,997,394 describes a melt-coated preparation containing sorbic acid in an amount of 5 to 30% by weight based on the composition, or about 0.43 to 0.05 times the weight of the coating agent, which is produced by spray cooling a molten fat slurry.

A sorbic acid preparation having a sorbic acid content as high as 60 to 95% which corresponds to a sorbic acid to coating agent ratio of 1.5 to 19 is also known (U.S. Pat. No. 3,065,080). However, a preparation having such a high content of sorbic acid has not been realized as a melt-coated preparation. This preparation is a solution-coated preparation obtained by dissolving a fat in a suitable solvent, spraying the solution successively onto powdery sorbic acid to coat it with the solution, and then evaporating the solvent. Such a solution-coated preparation is easier to obtain with a high sorbic acid content than the melt-coated preparation. However, in addition to the productional disadvantages incident to the use of solvent, the thin single-layer coating is susceptible to breakage, and tends to become imperfect. The coating can be made thicker by applying multiple layers, but as the number of layers increases the number of steps increases and it is difficult and time-consuming to secure a sufficient coating thickness. In addition, in the preservation of paste products the presence of a large amount of a fat in the preparation not only increases costs, but also impairs the flavor and taste of the paste products. It is desired to minimize the amount of the unwanted coating agent, and to increase the sorbic acid content, however, because in the preparations of paste products the sorbic acid must not elute in water at room temperature, it is difficult to upgrade the properties of the preparation, such as non-elution at room temperature by forming a solution-coated layer which is thin and is not susceptible to peeling.

SUMMARY OF THE INVENTION

It is one object of this invention to provide a melt-coated preparation having a high sorbic acid content suitable for use as a preservative for meat and fish paste products without impairing the non-elution of sorbic acid in water at room temperature.

It is another object of the present invention to provide a sorbic acid preparation having a high acid to coating ratio.

It is still another object of this invention to provide a sorbic acid preparation which does not elute in water in the paste at room temperature but dissolves during heating during production of the paste.

In preparing a sorbic acid preparation by the melt coating method, sorbic acid particles are dispersed in a melt of a coating agent to form a slurry, which is then granulated (i.e., coated sorbic acid particles are collected into grains) by spraying, etc., and solidified by cooling. When the concentration of sorbic acid in the slurry is increased to meet the objects of this invention, the slurry becomes very highly viscous, and it is difficult to charge the slurry through a pipe or to granulate it by spraying. It is for this reason that in the prior art, the amount of the coating agent is limited to at least 1.5 times the amount of sorbic acid, and, practically speaking, the amount of the coating agent is about 4 times the amount of sorbic acid, which corresponds to a sorbic acid/coating agent ratio of 0.25.

As a result of extensive investigations directed to a technical solution of the above problem, it has previously been found that the high viscosity accompanying a high-concentration slurry could be overcome to some extent by using sorbic acid having a particle diameter in the range of 20 to 80 microns which is larger than the fine powdery sorbic acid used in conventional techniques and a melt-coated preparation containing sorbic acid in an amount of 0.75 to 1.2 times the weight of the coating agent was obtained (Japanese Patent Application (OPI) No. 88318/78) (The term "OPI" as used herein refers to a "published unexamined Japanese patent application").

The present invention has resulted from further investigation and provides the following preparations and process for their production.

One embodiment of this invention is a melt-coated preparation comprising sorbic acid particles at least 80% by weight of which have a particle diameter of greater than 80 microns to about 150 microns and a coating agent composed mainly of solid fat, the amount of said sorbic acid being about 0.9 to 2 times the weight of the coating agent.

Furthermore in another embodiment the coating agent is composed of a solid fat and an acetomonoglyceride of a higher fatty acid or a monoglyceride of a fatty acid containing 6 to 18 carbon atoms.

The present invention also provides a process for preparing a melt-coated preparation, which comprises melting a coating agent composed of a solid fat or both a solid fat and a glyceride, dispersing sorbic acid in the melt, granulating the resulting slurry, and cooling the slurry to solidify it; wherein at least 80% by weight of the sorbic acid has a particle diameter of greater than 80 microns to about 150 microns and preferably 90 to 130 microns, the amount of said sorbic acid is about 0.9 to about 2 times the weight of the coating agent, and temperature of the slurry to be granulated is about 75° to about 110° C.

DETAILED DESCRIPTION OF THE INVENTION

Prior literature does not suggest the technical significance or sorbic acid particle diameter in a coated sorbic acid preparation. The requirement of a fine powdery material in Ueno et al. and the use of a pulverized product having a particle size of less than 10 microns in its working example suggests that it was common knowledge to use small particles of sorbic acid which could easily be introduced into the coating agent completely so as to obtain a good coated condition. The earlier work of the present inventors based on the discovery that the use of larger particles having a size of 20 to 80 microns unexpectedly provides a melt-coated preparation having a reduced fat content and a reduced tendency to elute at room temperature put to rest this belief. In this previous work, the upper limit on the particle diameter of sorbic acid was recognized as 80 microns and excessively large particles, for example, particles having a size of 100 to 200 microns resulted in inconveniences such as sedimentation. However, the presence of small amounts of particles having a particle diameter larger than 20 to 80 microns, for example, 18% of particles having a particle diameter of greater than 80 microns, was recognized as permissible.

In the present invention, detailed investigations of the conditions which permit handling a slurry for granulation have been made. That is, the manufacturing conditions such as the particle size, sorbic acid concentration, the type of coating agent, the properties of the slurry, the ability to granulate the slurry, the particle size of the resulting preparation, its elution at room temperature, and its usefulness in paste products have been studied. These studies have led to the discovery that when at least 80% by weight of the sorbic acid has a particle size greater than 80 microns to about 150 microns (preferably 90 to 130 microns) and it is used in an amount as large as about 0.9 to 2 times the amount of the coating agent, the flowability and stability of the slurry are unexpectedly well balanced and a slurry having a high sorbic acid content can be granulated. Moreover, a preparation having properties suitable for the preparation of paste products with regard to elution at room temperature can be obtained.

Since sorbic acid is a crystalline material, the particle size of sorbic acid corresponds to the diameter of the sorbic acid. The corresponding diameter can be measured by the sedimentation method which is a method generally used for this measurement. For practical purposes, particles which pass through a 100-mesh sieve but remain on a 200-mesh sieve are substantially particles having a diameter greater than 80 microns to about 150 microns.

When sorbic acid contains too many particles having a particle size of more than 150 microns, the coating characteristics of sorbic acid are still unexpectedly good, but when the resulting preparation is used in boiled fish flesh pastes, white spots tend to form. Preferably, therefore, the amounts of sorbic acid particles having a size of greater than 150 microns should be limited to not more than 10% by weight. When sorbic acid contains particles having a particle size of less than 80 microns, the viscosity of the slurry increases and its workability is degraded. However, when it is not necessary to increase the concentration of sorbic acid in the final preparation to too high a level with a relatively low ratio of sorbic acid to the coating agent, the presence of small particles of less than 80 microns in diameter is permitted depending on the level of the sorbic acid concentration required.

Sorbic acid having the particle diameter specified in this invention is obtained by selecting the recrystallization conditions or by pulverizing and sieving coarse crystals.

The coating agent used in this invention is composed mainly (i.e., at least 90% by weight) of a solid fat. The solid fat is solid at room temperature and is melted at the slurry temperature (75° to 110° C.) and the heated temperature used in the production of paste products (usually at least 80° C.). An edible oil such as a hardened beef tallow, hardened soybean oil, hardened whale oil, tristearin or a hardened colza oil can be used as the solid fat. If desired, an acetomonoglyceride of a higher fatty acid (usually having 16 or 18 carbon atoms) or a monoglyceride of a fatty acid having 6 to 18 carbon atoms may be used together with the solid fat in an amount of up to 10% by weight.

The acetomonoglyceride is a diacetate or monoacetate of a monoglyceride of a higher fatty acid (usually having 16 or 18 carbon atoms). Those sold on the market can be used. The fatty acid monoglycerides may be of the α- or β- structure. Suitable monoglycerides are those of fatty acids having 6 to 18 carbon atoms, such as caproic acid, caprylic acid, capric acid or stearic acid. Suitable commercially available acetomonoglycerides include Poem G-002 and Poem G-008 (made by Riken Vitamin Oil Co., Ltd.) and NYVACET (made by Eastman Chemical Co.). A suitable of commercially available monoglyceride is NYVEROL (made by Eastman Chemical Co.).

To produce a coated organic acid having a high organic acid content by melt-coating, the viscosity of the slurry must be suitable for use in an apparatus for spray granulation, etc. The slurry viscosity, on the other hand, greatly depends upon the concentration and the temperature of the slurry. Sorbic acid of various particle sizes was added in identical amounts to molten hardened beef tallow, a typical solid fat, to form 50% slurries, and their viscosity was measured. When the sorbic acid is a fine powder having a particle diameter below 10 microns, as in the prior art, the slurry has too high a viscosity to permit measurement. When sorbic acid having a particle size substantially within the range of 20 to 80 microns is employed, the viscosity of the slurry is about 30 poises. On the other hand, when slurries of various concentrations are prepared from sorbic acid having a particle diameter of 80 to 150 microns, the viscosities of these slurries are measured. The relation between the concentration, temperature and viscosity of the slurry is as follows:

| Temperature of the Slurry (°C.) | Viscosity of the Slurry (poise) Concentration of Sorbic Acid (wt %) | | | | | |
|---|---|---|---|---|---|---|
| | 45 | 50 | 55 | 60 | 65 | 70 |
| 70 | 9.5 | 17.5 | 28.0 | 30 | 34 | 42 |
| 80 | 7.1 | 15.0 | 23.0 | 27 | 32 | 37 |

| Temperature of the Slurry | Viscosity of the Slurry (poise) Concentration of Sorbic Acid (wt %) | | | | |
|---|---|---|---|---|---|
| (°C.) | 45 | 50 | 55 | 60 | 65 | 70 |
| 90 | 4.3 | 8.5 | 15.0 | 22 | 26 | 33 |

The limits on the ability to granulate the slurry differ depending upon the type of the apparatus, the temperature of the slurry actually used, the tolerance of the quality of the preparation, etc. It has been found that sorbic acid slurries generally cannot be granulated at a slurry viscosity of 35 poises at 80° C. The slurry granulated in the present invention preferably has a viscosity about 10 to 35 poise and most preferably about 10 to 20 poise. Thus, at 80° C. a slurry having a sorbic acid concentration of up to about 67% by weight, which corresponds to a sorbic acid/coating agent weight ratio of up to about 2, can be granulated (in the following description all percentages are by weight).

In the case of sorbic acid, too high a slurry temperature can lead to several problems. Since the increased temperature is accompanied by an increase in the vapor pressure of sorbic acid, the sorbic acid can sublime in the spraying chamber. If the resulting slurry is sprayed and cooled to obtain granules at the same time, the sublimed sorbic acid will also cool and precipitate on the surface of the granules. The precipitation of sorbic acid on the surface of the granules conflicts with the objective of the present invention, i.e., to prevent the elution of sorbic acid at room temperature.

Increased temperatures can also result in a decrease in the quality of the melt-coated preparation. Increased temperatures can result in coloration and polymerization which harms the appearance of the preparation and the sorbic acid can be chemically modified such that its use as a food additive is unsuitable. At high temperatures sorbic acid can also be dissolved in the fat coating which again conflicts with the objective of the present invention since sorbic acid dissolved in the fat more easily elutes from the preparation at room temperature.

In accordance with the present invention, suitable slurry temperatures for spray granulations range from about 75° to 110° C. When the temperature of the slurry is lower than 75° C., the viscosity of the slurry increases thereby making spray granulation difficult. Preferably spray granulation is carried out using a slurry viscosity of about 10 to 20 poise. Thus, in satisfying the object of the present invention to increase the sorbic acid content of these melt-coated preparations and in providing a suitable slurry viscosity for spray granulation, spray granulation is conducted at temperatures of about 75° to 110° C.

The viscosity of the slurry can be further reduced by substituting the aforesaid glyceride for a part of the coating agent. A slurry consisting of 2% of an acetomonoglyceride, 38% of a hardened beef tallow and 60% of sorbic acid having a particle size of 80 to 150 microns has a viscosity of about 20 poises at 80° C., which is considerably lower than the viscosity of a slurry consisting of 40% of the hardened beef tallow and 60% sorbic acid without the acetomonoglyceride. Thus, such a slurry is easier to granulate by spraying. The use of acetomonoglyceride in an amount as small as 2% based on the entire slurry can markedly reduce the viscosity of a high-concentration slurry containing sorbic acid having a particle size of 80 to 150 microns. However, when it is used in larger amounts, for example, in an amount of 8% (32% of the hardened beef tallow), the 60% slurry of sorbic acid still has a viscosity of 20 poises. The same effect is observed using a monoglyceride of capric acid, stearic acid, caproic acid or caprylic acid instead of the acetomonoglyceride.

The acetomonoglyceride or the monoglyceride of $C_6$-$C_{10}$ fatty acid has a low melting point and cannot be used alone as a coating agent. However, the use of a small amount of such a monoglyceride as a part of the coating agent produces a marked reduction in viscosity of the high-concentration slurry. The amount of the glyceride is determined such that it does not render the coated preparation tacky and it reduces the viscosity of the slurry efficiently. A suitable amount of the glyceride is not more than 10%, preferably 1 to 5%, based on the weight of the entire preparation.

Japanese Patent Publication No. 14104/70 (corresponding to U.S. Pat. No. 3,716,381) discloses that a part, for example, 2 to 10%, of a hardened oil as a coating agent may be replaced by a monoglyceride, an acetomonoglyceride or beeswax. In the present invention, it has been found that some of substances which are known to be used in conjunction with hardened oils are also effective for reducing the viscosity of the high-concentration slurry of sorbic acid having a particle diameter of 80 to 150 microns. Thus, by utilizing a novel combination of sorbic acid having a specified particle diameter and a coating agent composed of a solid fat and a specified glyceride, a melt-coated preparation having a sorbic acid content as high as 60 to 65% can be produced. Among known coating agents, however, a coating agent composed of, for example, a hardened oil and beeswax does not have the effect of decreasing the viscosity of the slurry. A coating agent composed of a hardened oil and monobutyrin tends to provide a preparation which is sticky. Thus, these coating agents are not desirable.

In the technical field of producing a coated organic acid by spray cooling an organic acid suspended in an oil or fat or hardened oil, a technique has recently been disclosed in which an organic acid having an average particle diameter of 30 to 70 microns which is slightly larger than in the conventional techniques is used (Japanese Patent Application (OPI) No. 19179/78). This Publication specifically discloses only the production of coated fumaric acid, and states that when an organic acid having an average particle diameter of more than 70 microns is used, coating becomes incomplete, and even when the average particle diameter is not more than 70 microns, if the proportion of large particles having a particle diameter of more than 150 microns is at least 5% based on the total amount of the organic acid, coating likewise becomes incomplete. This technique successfully gives a preparation containing an organic acid in an amount of least equal to the coating agent (specifically, the ratio of fumaric acid/hardened oil is 10/7) by using an organic acid having a specified particle diameter larger than 10 microns which has been known before. However, sorbic acid is merely given as one example of the organic acid, and no specific embodiment of sorbic acid is described.

The present invention is consistant with this prior art technique in that its purpose is to obtain a melt-coated preparation having a high content of an organic acid. But in the case of sorbic acid, the present invention contemplates the production of a preparation having a high content of sorbic acid by using sorbic acid having a larger particle diameter. As a result of increasing the particle diameter of fumaric acid, the increase in the granulation limit is remarkable at about 30 microns, and is gentle up to about 85 microns, as shown in the prior art technique. Even when such information on fumaric acid is analogously applied to sorbic acid and extended also to sorbic acid having a particle diameter of at least 85 microns to attempt at some increase in the granulatability limit, it has already been shown that the use of an organic acid having a particle diameter of at least 70 microns causes incomplete coating, as already described hereinabove. Although the prior art does not specifically describe, it is expected that when generally the particle size becomes large, the sedimentation rate of the slurry particles increases and the slurry is difficult to handle as a stable slurry. It is for this reason that in the prior art the amount of particles having a particle diameter of more than 105 microns is rigorously limited to 5% or below.

However, it has been made clear that in the case of sorbic acid, the expected difficulty encountered with an organic acid having a large particle diameter does not occur, contrary to the case of fumaric acid. It has been found that a high-concentration slurry of sorbic acid having a particle diameter of 80 to 150 microns can be handled without the troubles attributed to the sedimentation of large-diameter particles or the increased viscosity of small diameter particles, and that a preparation obtained by spray-granulating the slurry shows good non-elution in water at room temperature and can be used as a coated preparation without trouble. The reason slurries of sorbic acid do not have such high sedimentation rates is not clear. It is presumed, however, that the characteristics of sorbic acid under heating which are not fully understood act favorably.

In the present invention, it is necessary to use sorbic acid in an amount 0.9 to 2 times, preferably 1 to 1.5 times, the amount of the coating agent.

To achieve the object of this invention, better results are obtained by including larger amounts of sorbic acid with respect to the coating agent. The amount of sorbic acid, however, is limited by the requirement that the properties of the slurry are within the range which makes the granulating operation possible, and the coated condition of the resulting preparation should be satisfactory with regard to the non-elution at room temperature. The sorbic acid/melt-coating agent ratio of 1.5 is far higher than that in prior art sorbic acid preparations.

Sorbic acid is more volatile than fumaric acid, and therefore, the temperature of the slurry should be maintained low. This means that since the slurry viscosity tends to become high, sorbic acid is more difficult to form into a high content preparation than fumaric acid. Sorbic acid differs from fumaric acid in other properties, and it is impossible to anticipate the granulatability range of sorbic acid from that of fumaric acid. However, sorbic acid tends to be more difficult to form into a high content preparation than fumaric acid. In view of this, it will be understood that while in a working example of the latest technique (as disclosed in Japanese Patent Application (OPI) No. 19179/78) in which the particle size is limited to 30 to 70 microns, the highest content corresponds to a fumaric acid/coating agent ratio of 10/7, the sorbic acid preparation obtained by this invention has such a high content of sorbic acid. Even when the sorbic acid/coating agent ratio is 1.5 (60% preparation), granulation can be easily effected by the technique of the present invention. When this ratio increases, the slurry viscosity increases, and hence, the difficulty of granulation increases. In view of granulatability and the resulting preparation, the upper limit of this ratio in this invention is up to about 2.

When the amount of sorbic acid based on the coating agent is reduced, the desired preparation having a high sorbic acid content cannot be produced. Moreover, the slurry having a reduced viscosity shows outstanding sedimentation of sorbic acid particles, and inconvenience is caused in obtaining a preparation having a uniform composition. For this reason, sorbic acid is used in this invention in an amount at least 0.9 times the amount of the coating agent.

To produce the melt-coated preparation of this invention, an ordinary granulating means such as a spray cooling method or a flowing method can be used. Specifically, a coating composition containing a solid fat with or without a specified glyceride is melted, and with stirring, 0.9 to 2 times its weight of sorbic acid having a particle diameter substantially within the range of 80 to 150 microns is added to disperse it and to obtain a slurry. The temperature of the slurry affects its viscosity and hence its granulatability, and is suitably within the range of about 85° to 100° C. When the temperature of the slurry exceeds 120° C., sorbic acid dissolves in the coating agent, and the volatility or quality degradation of sorbic acid increases. Thus, too high a temperature should be avoided.

The slurry is then granulated by a known means using a nozzle or disc. To granulate the high-concentration slurry in accordance with this invention, a rotary disc or a normal pressure nozzle is preferred to a pressurized nozzle which is liable to be clogged. The finely divided slurry is formed into granules by the action of surface tension, and upon solidification by cooling, the melt-coated preparation of this invention can be obtained.

In addition to containing sorbic acid in a specified proportion, the coated sorbic acid preparation should not elute during mixing and grinding at room temperature when it is used in meat paste products such as boiled fish flesh paste. Furthermore, the coated sorbic acid preparation should dissolve upon heating. This can easily be accomplished by using fats which melt at temperatures lower than the heating temperature for paste products, for example, about 60° C.

The elution at room temperature is evaluated by stirring the sample preparation together with water containing a surface active agent, and determining the proportion of the eluted acid component by means of titration. The presence of the surfactant in the water serves to better disperse the preparation in water.

The preparation produced by the present invention greatly differs from known preparations with regard to composition and sorbic acid particle size, but the particle diameters of these preparations are not much different from each other and range from about 100 microns to about 350 microns. It is anticipated, therefore, that the internal structure of the preparation composed of sorbic acid crystals and a coating agent enveloping them or binding them to each other is changed.

The problem of slurry viscosity can be overcome by the conditions described and a preparation having a minor proportion of a coating agent and a major proportion of sorbic acid can be produced. However, if large crystals of sorbic acid are exposed to the atmosphere, and elute at room temperature, the object of this invention cannot be achieved. The specified manufacturing conditions in this invention not only have overcome the difficulty of granulation of a high-concentration slurry, but also have surprisingly made it possible to obtain a preparation which has equal or better non-elution at room temperature to conventional preparations produced by coating fine crystals with a large amount of a fat. The rate of elution of a sorbic acid preparation having a concentration of 50 to 55% can be maintained as low as 2%, but with a larger sorbic acid content, the rate of elution increases. In this regard, the rate of elution at room temperature of a coated sorbic acid preparation obtained by the prior art is, for example, about 6 to 11% as shown in the Experimental Results submitted in re Japanese Patent Appeal No. 8196/71. According to this invention, preparations having a sorbic acid content about 2 times the amount of coating agent can be manufactured.

Thus, according to this invention, the selection of a specified particle size range and a specified composition ratio has led to the discovery of an unexpectedly advantageous balance of complex factors such as the viscosity, sedimentation rate and granulating characteristics of the slurry and the quality of the resulting preparation, and it is thus possible to create a coated preparation having a far higher sorbic acid content than known preparations and with fully satisfactory characteristics with regard to non-elution at room temperature, etc.

The following Examples illustrate the present invention in greater detail. All parts and percentages in these Examples are by weight.

EXAMPLE 1

Sorbic acid was screened through an 80-mesh sieve (the mesh distance being 175 microns) to remove coarse particles. Particles which passed through the 80-mesh sieve were subjected to a 200-mesh sieve (the mesh distance being 74 microns) to remove fine particles. The particle diameter of the resulting sorbic acid particles was found to be mainly 80 to 150 microns when determined by a sedimentation method.

A hardened beef tallow having a melting point of 55° to 60° C. was melted, and while stirring 500 parts of the molten beef tallow maintained at 80° to 85° C., 500 parts of the above sorbic acid was added and dispersed fully to obtain a uniform slurry. The slurry had a viscosity, as measured by a B-type viscometer, of about 12 poises. When it was allowed to stand for about 1 hour, little sedimentation was observed.

The slurry was made into fine particles by a granulator equipped with a rotary disc type spraying mechanism. The particles were cooled while they fell through the air at 20° to 30° C. to obtain a coated sorbic acid preparation containing 50% of sorbic acid. The particle diameter of the preparation, measured by a sedimentation method (using a light-transmitting type particle size distribution measuring device, made by Seishin Kigyo K.K.), was 40 to 350 microns with an average particle size of 180 microns.

One part of the resulting preparation was added to 200 parts of water at 20° C. containing 0.1% of a non-ionic surface active agent, and the mixture was stirred for 10 minutes. The mixture was then filtered, and the filtrate was titrated with a 0.1 N aqueous solution of sodium hydroxide to determine the amount of the acid eluted. The elution rate of the acid based on the sorbic acid contained in the preparation was only 1.67%.

Then from 450 parts of the same hardened beef tallow and 550 parts of the same sorbic acid, a slurry having a viscosity of 20 poises was prepared. A 55% preparation formed in the same was as above had a elution rate of 1.64%.

EXAMPLE 2

Coarse particles of sorbic acid were pulverized and sieved to obtain particles which passed through a 100-mesh sieve but remained on a 200-mesh sieve. The particle diameter of these particles was 80 to 150 microns.

600 parts of the resulting sorbic acid particles were added to 400 parts of a hardened beef tallow having a melting point of 55° to 60° C. and maintained at 85° to 90° C. to form a uniform slurry. The slurry was granulated by a spray granulator, and cooled with cold air. The resulting sorbic acid preparation had a particle diameter of 150 microns on an average, and the elution rate of the preparation measured by the same method as in Example 1 was 3.2%.

EXAMPLE 3

360 parts of a hardened beef tallow having a melting point of 55° to 60° C. was mixed in the molten state at 85° to 90° C. with 40 parts of acetomonoglyceride having a melting point of 28° C. To the resulting mixture was added 600 parts of the same sorbic acid as used in Example 1 to form a uniform slurry. The slurry was granulated by means of a disc type spray granulator. The particle size of the resulting sorbic acid was 140 microns on an average, and the elution rate measured in the same way as in Example 1 was 5.5%.

EXAMPLE 4

A slurry was prepared in the same way as in Example 3 except that monocaprylin was used instead of the acetomonoglyceride. The resulting slurry was spray granulated to afford a coated sorbic acid preparation having an average particle diameter of 150 microns and an elution rate of 5.3%.

EXAMPLE 5

A slurry having a viscosity of 25 poises was prepared from 310 parts of a hardened beef tallow having a melting point of 55° to 60° C., 40 parts of acetomonoglyceride having a melting point of 28° C. and 650 parts of the same sorbic acid as used in Example 1. The slurry was spray granulated to obtain a 65% preparation. The elution rate was 10.5%.

COMPARATIVE EXAMPLE

A 50% slurry was prepared from sorbic acid having a particle diameter of 100 to 250 microns and a hardened beef tallow. The slurry had a viscosity of 6 poises at 80° C. Although the slurry viscosity was low, its sedimentation rate was great and presented difficulties in practical application. When the slurry was spray-granulated on a trial basis, a preparation was obtained which unexpectedly showed an elution rate of as good as 2.8%. However, when it was used in the production of "kamaboko" (boiled fish flesh paste), white spots appeared markedly in contrast to the case of using the preparations obtained in Examples 1 to 5.

Antibacterial Test

Frozen flesh of Alaskan pollack (1 kg), 30 g of common salt and 100 g of water were mixed, and ground for 40 minutes. Then, 300 g of cold water, 3 g of sugar, 7.5 g of seasonings, 15 g of "mirin" and 40 g of starch were added. The mixture was ground further for 5 minutes. One hundred grams of the resulting material for "kamaboko" was taken, and well mixed with each of the preservatives shown in the following table. The mixture was placed on a Petri dish and steamed at 90° to 95° C. for about 20 minutes, and then cooled to form a culture medium. Each of the following bacteria was inoculated in the culture medium and cultivated at 30° C. for 24 hours. Then, the presence of a bacterial colony was determined. The bacteria used were DCB-11 (*Escherichia coli*), DCB-12 (Staphilococcus) and DCB-14 (*Bacillus subtilis*).

The experimental results are shown by "+" which indicates the presence of a colony, or "−" which shows the absence of a colony.

| Preservative | Concentration | DCB-11 | DCB-12 | DCB-14 |
|---|---|---|---|---|
| Sorbic Acid | 0.1 | ± | + | + |
| | 0.2 | − | − | − |
| Potassium Sorbate | 0.5 | + | + | + |
| | 1.0 | − | + | − |
| 60% Preparation of Example 2 | 0.08 | + | + | + |
| | 0.10 | ± | − | − |
| | 0.20 | − | − | − |

While the invention has been described in detail and with reference to specific embodiments thereof, it will be apparent to one skilled in the art that various changes and modifications can be made therein without departing from the spirit and scope thereof.

What is claimed is:

1. A melt-coated solidified spherical preparation comprising sorbic acid particles bound together by and coated with a coating agent composed mainly of a solid fat, at least 80% by weight of said sorbic acid having a particle diameter greater than 80 microns and up to a maximum particle size of about 150 microns, the amount of said sorbic acid in said spherical preparation being about 0.9 to 2 times the weight of the coating agent.

2. The melt-coated preparation of claim 1, wherein the coating agent is composed of a solid fat and an acetomonoglyceride of a higher fatty acid or a monoglyceride of a fatty acid containing 6 to 18 carbon atoms.

3. The melt-coated preparation of claims 1 or 2, wherein the amount of said sorbic acid is about 1.0 to 1.5 times the weight of the coating agent.

4. The melt-coated preparation of claims 1 or 2, wherein at least 80% by weight of the sorbic acid has a particle diameter within the range of about 90 to 130 microns.

5. A process for preparing a solidified spherical melt-coated preparation which comprises melting a coating agent composed mainly of a solid fat, dispersing sorbic acid in said melt, granulating the resulting slurry, and cooling the slurry to solidify it, wherein at least 80% of the sorbic acid has a particle diameter of greater than 80 microns and up to a maximum particle size of 150 microns and the amount of said sorbic acid in said spherical preparation is about 0.9 to 2 times the weight of the coating agent.

6. The process of claim 5, wherein said slurry is granulated at about 75° to 110° C.

7. The process of claim 5, wherein the amount of said sorbic acid is about 1.0 to 1.5 times the weight of the coating agent.

8. A method of preserving meat and fish which comprises adding a preservative comprising a solidified spherical melt-coated preparation comprising sorbic acid particles and a coating agent composed mainly of a solid fat, at least 80% by weight of said sorbic acid having a particle diameter greater than 80 microns and up to a maximum particle size of about 150 mirons, and the amount of said sorbic acid in said spherical preparation being about 0.9 to 2 times the weight of the coating agent to raw fish and heating to release the sorbic acid.

9. The method of claim 8, wherein the coating agent is composed of a solid fat and an acetomonoglyceride of a higher fatty acid or a monoglyceride of a fatty acid containing 6 to 18 carbon atoms.

10. The method of claims 8 or 9, wherein the amount of said sorbic acid is about 1.0 to 1.5 times the weight of the coating agent.

11. The method of claims 8 or 9, wherein at least 80% by weight of the sorbic acid has a particle diameter within the range of about 90 to 130 microns.

12. The method of claim 8, wherein said melt-coated preparation is prepared by the process which comprises melting a coating agent composed mainly of a solid fat, dispersing sorbic acid in said melt, granulating the resulting slurry, and cooling the slurry to solidify it, wherein at least 80% of the sorbic acid has a particle diameter of greater than 80 microns to 150 microns and the amount of said sorbic acid is about 0.9 to 2 times the weight of the coating agent.

13. The method of claim 12, wherein said slurry is granulated at about 75° to 110° C.

14. The method of claim 13, wherein said slurry has a viscosity of about 10 to 35 poise.

* * * * *